United States Patent
Schreiber et al.

(10) Patent No.: US 9,879,726 B2
(45) Date of Patent: Jan. 30, 2018

(54) STRUCTURING OF SLIDING SURFACE PORTIONS

(71) Applicant: MAG IAS GMBH, Göppingen (DE)

(72) Inventors: Leo Schreiber, Schwäbisch Gmünd (DE); Wolfgang Hafner, Süßen (DE); Matthias Weber, Bretten (DE); Jürgen Reingen, Göppingen (DE); Hans Kuhn, Lebach (DE); Emanuel Groß, Lebach (DE); Maarten Brussee, BP Haren (NL)

(73) Assignee: MAG IAS GmbH, Goppingen (DE)

( * ) Notice: Subject to any disclaimer, the term of this patent is extended or adjusted under 35 U.S.C. 154(b) by 85 days.

(21) Appl. No.: 14/405,629

(22) PCT Filed: Jun. 4, 2013

(86) PCT No.: PCT/EP2013/061432
§ 371 (c)(1),
(2) Date: Jan. 16, 2015

(87) PCT Pub. No.: WO2013/182539
PCT Pub. Date: Dec. 12, 2013

(65) Prior Publication Data
US 2015/0167737 A1    Jun. 18, 2015

(30) Foreign Application Priority Data
Jun. 4, 2012 (DE) .......................... 10 2012 104 817
Mar. 25, 2013 (EP) ..................................... 13160919

(51) Int. Cl.
*F16C 33/14* (2006.01)
*F16C 33/10* (2006.01)
(Continued)

(52) U.S. Cl.
CPC ............... *F16C 33/14* (2013.01); *B23H 7/32* (2013.01); *B23H 9/00* (2013.01); *C25F 3/02* (2013.01);
(Continued)

(58) Field of Classification Search
CPC .......... F16C 9/02; F16C 33/1065; F16C 9/04; F16C 3/14; F16C 33/1075
See application file for complete search history.

(56) References Cited

U.S. PATENT DOCUMENTS 4,105,267 A * 8/1978 Mori ................... F16C 33/1065
                                                              384/291
6,835,299 B1   12/2004 Tchugunov
(Continued)

FOREIGN PATENT DOCUMENTS

DE            2234428        7/1972
DE            3634708        4/1988
DE        102008054080       5/2009

*Primary Examiner* — Thomas C Diaz
(74) *Attorney, Agent, or Firm* — Head, Johnson, Kachigian & Wilkinson, PC

(57) ABSTRACT

In order to reduce friction of a crank shaft during operation by a large amount with low complexity through structuring sliding bearing surfaces (1) of the crank shaft through controlled introduction of microscopically small indentations (27) it is proposed for the center bearings and the crank bearings to only structure highly loaded portions of the bearing surface in circumferential direction and also in axial direction since this is already difficult to achieve in view of the operating gap towards the tool that only has a size of a few μm.

7 Claims, 8 Drawing Sheets

(51) Int. Cl.

| | | |
|---|---|---|
| *B23H 7/32* | (2006.01) | |
| *B23H 9/00* | (2006.01) | |
| *C25F 3/02* | (2006.01) | |
| *F16C 9/02* | (2006.01) | |
| *F16C 17/02* | (2006.01) | |
| *B23H 3/00* | (2006.01) | |

(52) U.S. Cl.
CPC ................ *F16C 9/02* (2013.01); *F16C 17/02* (2013.01); *F16C 33/103* (2013.01); *B23H 3/00* (2013.01); *B23H 2200/10* (2013.01); *B23H 2300/10* (2013.01); *F16C 2220/60* (2013.01); *F16C 2223/08* (2013.01)

(56) References Cited

U.S. PATENT DOCUMENTS

| | | | |
|---|---|---|---|
| 8,231,277 B2* | 7/2012 | Morales Espejel | F16C 17/02 384/113 |
| 2002/0126923 A1 | 9/2002 | Usui | |
| 2003/0021711 A1 | 1/2003 | Klink et al. | |
| 2003/0024122 A1 | 2/2003 | Ichiyama et al. | |
| 2010/0024592 A1 | 2/2010 | Maurin-Perrier et al. | |

\* cited by examiner

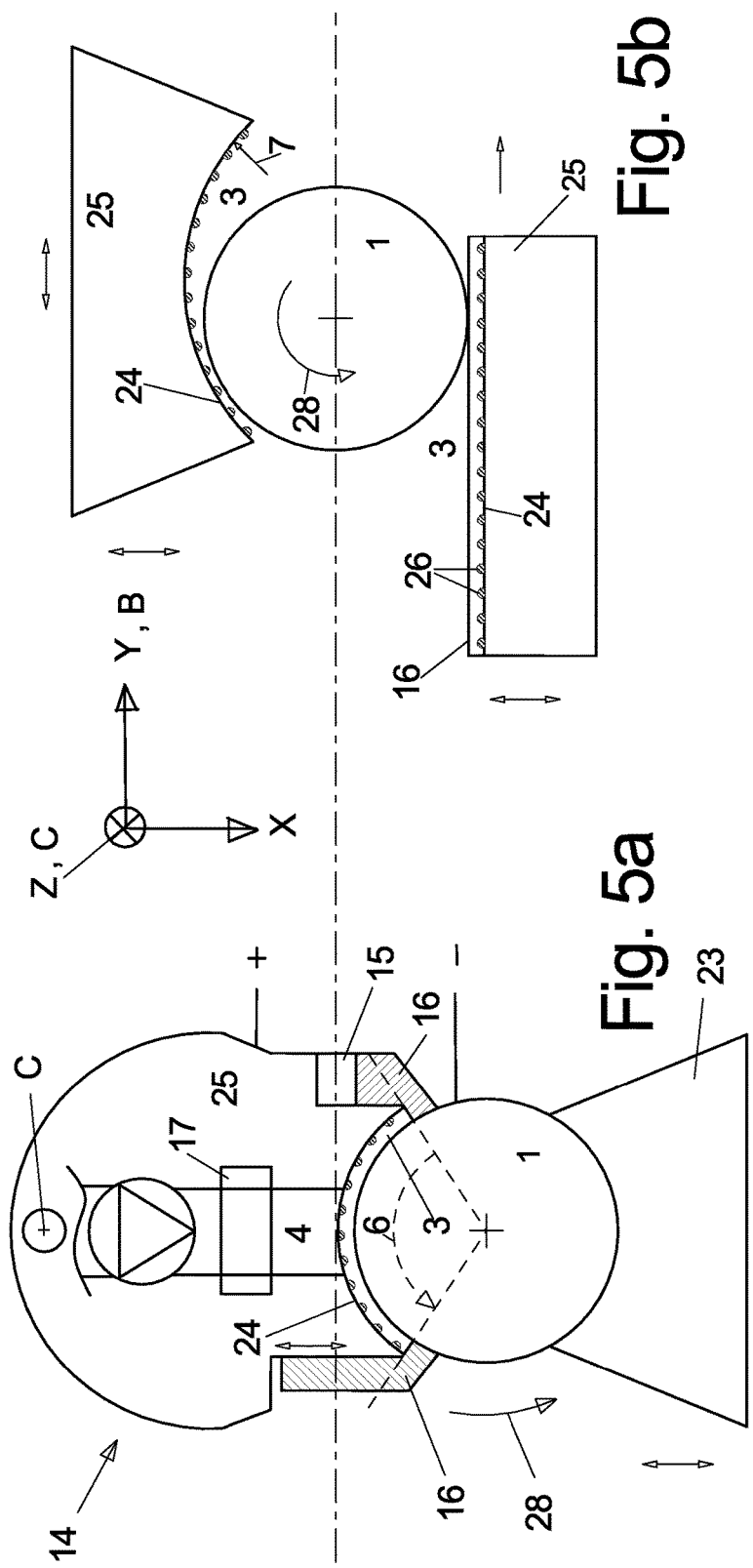
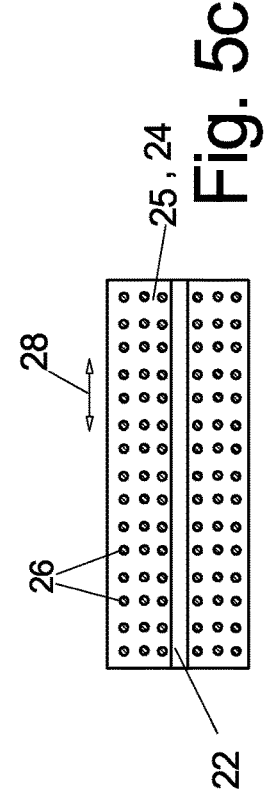

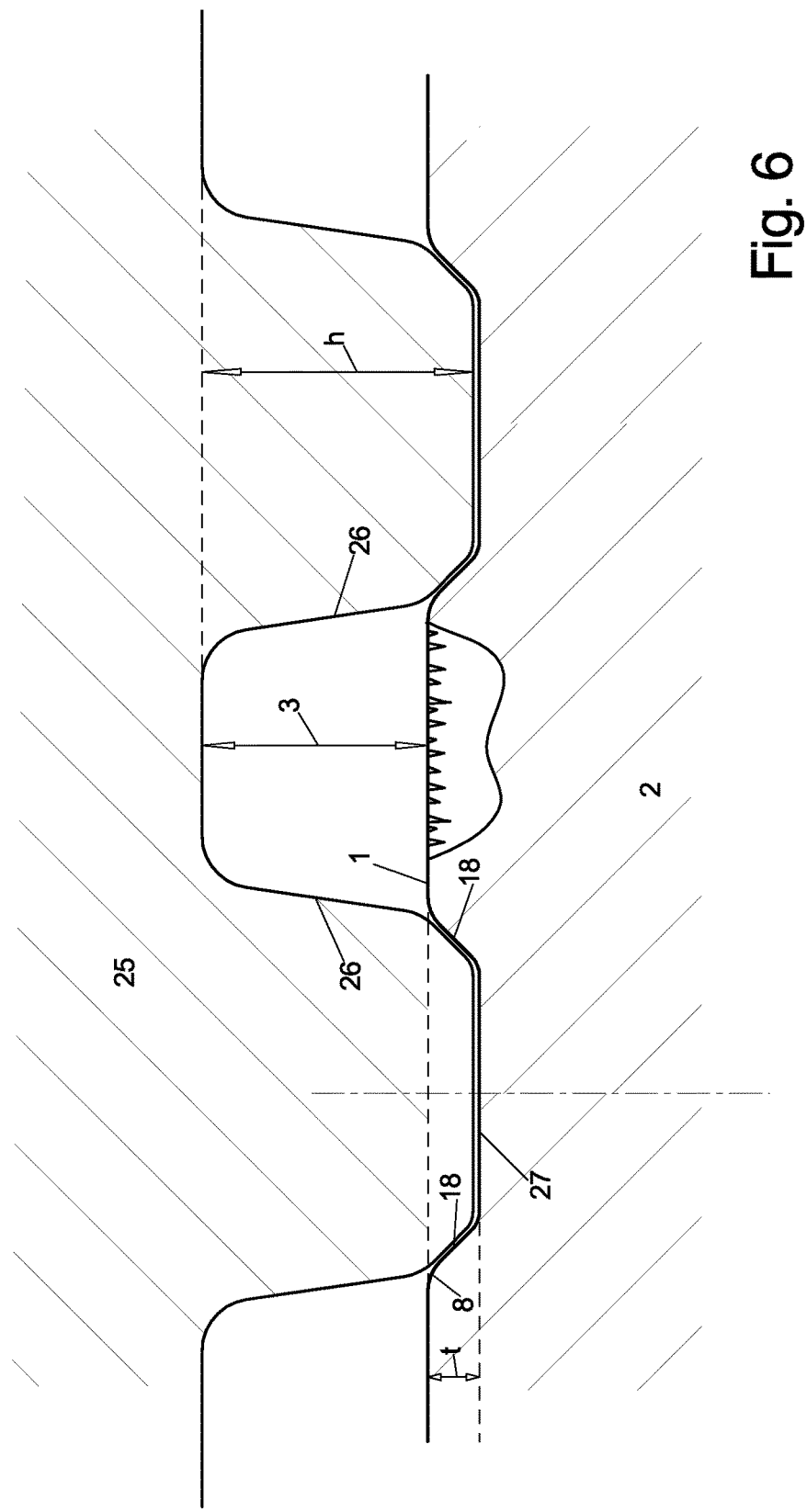

STRUCTURING OF SLIDING SURFACE PORTIONS

I. FIELD OF THE INVENTION

The invention relates to a sliding surface of a slide pairing, in particular the sliding bearing surface or a radial bearing, in particular the bearings of a crank shaft in an internal combustion engine, on one side relative to an engine block on the other side relative to connecting rods.

II. BACKGROUND OF THE INVENTION

In sliding surfaces of a lubricated sliding pairing it is essential for the amount of the sliding friction and also for the service life of the sliding pairing, in particular of the sliding bearing that a sufficient amount of lubricant is provided in all operating conditions and in a distribution that is as even as possible between contact surfaces of the sliding bearing. In particular a beginning of the relative movement between the sliding surfaces is critical.

Through an increasing use of start-stop systems in motor vehicles this relevance substantially increases at bearings of a crank shaft since the number of start up processes of the sliding bearings is increased by a factor of 100 or more.

For this reason contact surfaces of sliding bearings are machined so that they have small indentations which serve as a reservoir for a lubricant. The indentations are provided due to the normal roughness of the material of the sliding surface or they are introduced in a controlled manner. Therefore the contact portion of a sliding bearing, thus the surface portion where the contact surfaces actually contact one another is always significantly below 100% partially even below 60%.

The respective structuring of the sliding surfaces is provided through special machining steps like grinding, finishing or honing wherein, however, a particular arrangement of the indentations cannot be predetermined and also the variation in respect to size, in particular depth of the indentations is relatively large. In particular the result of the structuring depends also greatly upon the experience of the person performing the work.

In order to obtain a defined structuring of the contact surface of a sliding bearing with respect to number, size, depth and distribution of the indentations it is also already known to impact the surface with a laser in order to obtain the desired indentations.

This method, however, on the one hand side has a disadvantage in that it is very time consuming for a large number of indentations and furthermore the impacting laser beam does not only produce an indentation in the surface but also a protrusion that envelops the indentation with a ring shape, wherein the protrusion is undesirable in many cases and requires additional finishing for removing the protrusion. Typically a flank shape of the recess produced by the laser is not controllable.

It is another disadvantage that laser machining provides a spatially limited strong heating and subsequent quick cooling which leads to undesirable new hardened zones.

Furthermore the machining method of electrochemical etching (ECM) is known which can also be used in a pulsed variant (PECM).

This produces three dimensional surfaces, for example the three dimensional surfaces of coins or the described indentations are introduced into surfaces wherein typically only a removal of 30 μm at the most is economically viable with this method.

Through approaching an accordingly configured negative electrode towards the surfaces to be machined material is removed from this surface which is possible through this method in a much finer manner than through electrical eroding.

For electrical current conduction and removal of eroded materials a current conducting liquid is pressed through a gap between the tool and the work piece during the entire process.

In crank shafts, in particular crank shafts for car engines with high numbers of cylinders, as work pieces an additional complication is that they are instable work pieces and thus difficult to machine. Dimensional compliance of a finished crank shaft is primarily determined besides by axial bearing width by determining the following parameters:

diameter deviation=maximum deviation from a predetermined nominal diameter of the bearing pinion, circularity=macroscopic deviation from a circular nominal contour of the bearing pin stated by the distance of an outer and inner enveloping circle, concentricity=radial dimensional deviation for a rotating work piece caused by an eccentricity of the rotating bearing and/or a dimensional deviation of the bearing shape from an ideal circular shape, roughness in the form of a mean single depth of roughness Rz=computed value representing the microscopic roughness of a surface of a bearing, contact surface portion=the contacting surface portion of the microscopically viewed surface structure which contacts a contacting opposite surface, and in addition for the crank bearings, stroke deviation=dimensional deviation of the actual stroke (distance of the actual center of the crank pin from an actual center of the center bearings) from the nominal stroke, and angular deviation=in degrees or longitudinal dimension with reference to stroke, circumferential deviation of the actual angular position of the crank pin from its target angular position relative to a center axis and with reference to the angular position relative to the remaining crank pins.

Thus, maintaining the desired tolerances is limited for these parameters by the available machining methods and by the instability of the work piece and by the machining forces.

Also the efficiency and the economics of the method are of great importance for practical applications, in particular for mass production where cycle time and thus production costs play a significant role, wherein the machining operations for prototypes are not subject to these limitations.

This applies in particular for the last method steps when producing for example a crank shaft, fine machining and surface structuring.

III. DESCRIPTION OF THE INVENTION a) Technical Object

Thus it an object of the invention to provide a structured sliding surface and a method and tool to produce the structured sliding surface which facilitates efficient production in spite of a significant reduction of friction in particular in a hydrodynamic sliding bearing.

b) Solution

This object is achieved through the features of claims 1, 16, 18 and 20. Advantageous embodiments can be derived from the dependent claims.

With respect to the sliding surface which can be a surface of a sliding bearing or also a sliding surface e.g. of a cam shaft the object is achieved in that not the entire sliding surface is structured but only portions which significantly reduces structuring complexity but leads to a substantially identical result with respect to friction reduction as a complete structuring of the sliding surface in particular in that only portions that are under a maximum load are structured or more structured than the rest. Thus, a differentiation has to be made between portions to be structured or more strongly structured in movement direction of the sliding surface relative to the opposite surface of the sliding pairing, the longitudinal direction or transversal thereto.

The portions that are less loaded are either not structured at all or structured less which can mean that number, size, depth or other parameters of the indentations through which the structuring is provided are selected lower so that the structuring complexity in this portion is less or completely eliminated when these less loaded portions are not structured at all.

Subsequently only structured portions are discussed which means that these portions are the only ones that are structured, thus the remaining portions are not structured at all or that these portions are structured more than the rest of the sliding surface.

Transversal to the movement direction advantageously the center portion is structured relative to the edge portions, in particular when one of the two sliding surfaces of a sliding surface pairing viewed in movement direction is configured convex. This has the consequence that the center portion has the lowest thickness of the lubrication gap so that the risk of running dry is the greatest therein.

For rotation symmetrical sliding surfaces, in particular sliding bearing surfaces only a particular circumferential portion in movement direction is structured, in particular a portion of less than 90°, better less than 70°, better less than 60°.

When the sliding surface is the sliding surface of a crank shaft for a internal piston combustion engine the structuring is performed as follows: in circumferential direction only the segment of the enveloping surface of the crank bearing pinion is structured which is loaded strongest by the connecting rod when the respective piston fires and the explosion pressure builds up thereafter. This is advantageously a portion of 30° in rotation direction up to 60° against the rotation direction of the crank bearing, in particular of 20° in rotation direction up to 55° against the rotation direction from the radially outermost point of the crank pinion viewed from the center bearing axis of the crank shaft.

For the center bearing pinions there are two options:

Either only the circumferential segment of the center bearing is structured which is arranged opposite to the two adjacent crank bearing pins in radial direction and which is oriented away from the structured surfaces of the crank bearing pins, wherein the there is only one adjacent crank bearing pinion for the first and the last center bearing pinion.

It is another option to only structure the same circumferential portions at each center bearing pinion, thus the circumferential portions that are opposite to the structure portions of all crank bearing pinions viewed in axial direction and which are oriented away from the structured portions of all crank bearing pinions. In a crank shaft for a 6 cylinder engine this are typically three circumferential portions per center bearing pinion, in a 4 cylinder engine these are typically only two circumferential portions per center bearing pinion.

This reduces sliding friction, in particular in highly loaded circumferential portions in which the sliding friction due to the strong operating loading can be many times higher during operations than in the remaining circumferential portions. Thus in spite of structuring only a portion of the sliding surface, typically significantly below 50%, a reduction of the overall friction is caused in the amount of 80-90% of the friction reduction which would occur through complete structuring of the sliding surface.

Advantageously the structuring is performed through electro chemical machining (ECM), in particular pulsed electrochemical machining (PECM). The latter stipulates that the current loading of the two electrodes on one side the tool and on the other side the work piece is pulsed. Advantageously a periodic approximation and removing of the tool relative to the work piece is provided, typically by a vibrating movement of the tool, wherein the current loading is provided in the point of respective greatest approximation between tool and work piece. In intermediary periods without current in which the distance is even greater, the removed metal ions are flushed out through the electrolyte pumped through in between.

In a sliding pairing including two sliding surfaces moved relative to one another advantageously only one of the sliding surfaces is partially structured as described supra since the structuring also of the opposite surface typically only provides an insignificant improvement in friction reduction.

Thus, the recesses should have a depth of 10 µm at the most, in particular 5 µm at the most, in particular 1 µm at the most, since an excessive depth can prevent a sufficient build up of the pressure of the lubricant in the portion of the indentation. It has furthermore become apparent that the depth relative to the greatest surface extension of the recess should be in a particular ratio, namely between 0.005 and 0.002, in particular between 0.008 and 0.012.

In a portion between the indentations the surface should have a roughness, whose roughness Rz is advantageously less than the depth of the indentations and in particular below 5 µm, better between 1 µm and 4 µm. The portion between the indentations should be at least 50% and at the most 85% in order to obtain an optimum low friction.

It has furthermore become apparent that in top view the minimum extension of the individual recess should be 150 µm at the most, better only 100 µm at the most or even 50 µm at the most. Furthermore the ratio of the greatest extension of the indentation to the smallest extension of the indentation should be a factor of 10 at the most, better only a factor of 5, or even only a factor of 3. The surface portion of the structured surface that is covered with the indentations should be between 1% and 30%, in particular between 10% and 20%.

Furthermore it has proven helpful to configure an edge of the indentations thus a transition between the flanks of the indentations to the remaining surface of the sliding surface with a curvature with a radius of at least 2 µm and/or a slant angle of less than 60° relative to the surface, since the lubrication oil collected in the indentation can move better out of the indentation.

For the same reason, in a sectional view in a direction of the relative movement direction of the sliding surface to the opposite surface the flank of the indentation oriented opposite to the movement direction of the sliding surface should extend less steep than the opposite flank, in particular at an angle of 45° at the most, better 30° at the most, better 25° at the most, better 20° at the most relative to the surface between the indentations.

With respect to the machine for machining rotation symmetrical sliding surfaces, in particular at the bearings of a crank shaft, through electrochemical machining the object is achieved in that the machine is a machine tool with a work piece-spindle arrangement like for a turning machine which includes a controlled C-axis and in which the machining tool is in particular arranged in a tool unit that is actively moveable in X-direction and in Z-direction, however moveable within limits in Y-direction, in particular supported in a floating bearing that is moveable in a range of +/−100 μm.

Advantageously the tool unit is rotatable about the B-axis within limits and thus supported in a floating manner.

With respect to the tool for machining rotation symmetrical surfaces, in particular of bearings at a crank shaft through electrochemical machining, the object is achieved in that the effective surface of the tool in movement direction extends in circumferential direction of the rotation symmetrical bearing in a portion of less than 90°, in particular of less than 70°, in particular of less than 60°, in particular of less than 45°.

Advantageously the effective surface of the tool
is either arranged flat and tangential to the convex cambered sliding surface of the bearing,
or arranged convex cambered, however with a curvature radius that is in particular greater by a factor of 1.1-2.0 than the convex cambered sliding surface to be machined.

This provides that a distance between tool and work piece is smallest in a center of the sliding surface portion machined by the effective surface so that a depth of the introduced indentations is the greatest and is imaged the strongest onto the sliding surface at this location, while the indentations become shallower and shallower remote from this location of the smallest distance so that the structuring decreases.

Additionally the smoothing effect between the indentations which is caused by the effective surface of the tool is the greatest in the portion of the smallest distance.

Both in combination cause the greatest friction reduction in the point of the smallest distance when the point of the smallest distance coincides with the point of the highest load in circumferential direction.

For the same reason the protrusions on the effective surface of the tool should be higher at least by a factor of 2, better by a factor of 3 than a maximum depth of the indentations to be produced therewith.

With respect to the method for machining sliding surfaces through electrochemical machining (ECM) the object is achieved in that a distance between tool and work piece becomes greater and smaller in an alternating manner during machining, in particular through a respective vibration of the tool.

On the other hand side the current loading of the tool can be performed in a pulsating manner (PECM) in order to keep the heating of the work piece small, thus in particular synchronous to the vibration, thus the distance reduction, so that the current pulse is provided respectively in particular at the point in time of maximum approximation between tool and work piece and removing the metal ions is feasible particularly well. During the subsequent larger offsetting the removed metal ions are extracted even better through the electrolyte flowing there between. Thus, the tool stands still relative to the work piece in circumferential direction.

In order to be able to position the tool sufficiently precisely relative to the work piece in spite of the small operating gap and the crank shaft being a work piece that is difficult to handle spacers are advantageously attached at the tool through which the tool contacts the surface to be machined, thus the bearing surface of the crank shaft. For this purpose the spacers have to be made from electrically non conductive material.

Advantageously the spacers are configured as spacer bars which are arranged at ends of the tool in circumferential direction.

Since the circumferential direction in this case forms the largest extension of the tool a flushing groove is advantageously machined in circumferential direction in the effective surface of the tool, wherein an outlet for the electrically conducting liquid, thus the flushing electrolyte, leads into the flushing groove which in particular has a depth of at least $\frac{1}{10}$ mm. Thus, the electrolyte flows in circumferential direction to the ends of the tool where the spacer bars provide at least partial sealing and from there the electrolyte flows through the operating gap in axial direction to both axial ends of the effective surface of the tool.

In order to control the method, in particular in order to control the point in time of stopping the machining the temperature of the electrolyte is used as a control variable for continuous current loading and/or the strength of the current is used as a control variable.

For pulsating current loading, however, the number of pulses and/or the duration of the pulses are used as a control variable.

If however the distance between tool and work piece is changed in an oscillating manner for example the pressure variation in the supply of the electrically conducting liquid is used as a control variable for controlling the machining, in particular for the point in time of stopping the machining, since increasing approximation of the tool to the surface of the work piece renders the outflow of the electrolyte through the operating gap more difficult and increasing pressure builds up in the supply conduit of the electrolyte.

It is another option to configure the spacers, in particular the spacer bars with a variable oscillating thickness for example as a piezo element and to cause an oscillating variation of a thickness of the element by respectively loading the element with a current.

Another option is to let the spacers, in particular the spacer bars continuously contact the surface to be machined but to support the tool moveably relative to the spacer bars and to move the tool in a suitable oscillating manner to the work piece and away from the work piece which has to be performed very quickly in view of a total machining time of a few seconds.

In order to vary the imaging precision of the surface structure of the tool on the work piece
either the distance between tool and work piece can be varied, thus the minimum distance during the vibration, or the current can be varied.

This way two independently controllable variables are provided for changing imaging precision and thus in particular also for changing the depth of the indentations with the same tool.

It has proven particularly economical to provide a material removal of 30 μm at the most, better only 20 μm, better only 10 μm, in particular at least 0.5 μm, better at least 2 μm through electrochemical machining, in particular when machining the entire surface, thus not only introducing individual indentations. In this range it is assured that a microscopic smoothing effect occurs already, without the provided micro structure being removed down to the deepest valleys.

For an economical processing of this type the tool is supported best at a distance of 5-400 μm, better 10-100 μm relative to the surface to be machined.

In order to produce indentations the tool can either have respective protrusions on its effective surface which represent a respective negative structure of the surface of the work piece to be obtained, or the tool has a smooth effective surface and the effective surface is covered with a mask made from electrically non conductive material which has cut outs through which current can flow. In this case the required liquid electrolyte is introduced and let out in particular between the mask and the surface of the work piece to be machined wherein the introduction and run out of the electrolyte is in particular provided along the surface of the work piece.

Advantageously a deburring can be performed also in an interior of the work piece through electrochemical machining, advantageously in the same process step with structuring the sliding surface, in particular at the intersections of bore holes and by the same token at an inlet of the bore holes into the work piece. For this purpose a particular configuration of the tool may be required, however no additional machining time is required.

The machining parameters like machining time, number of pulses, current applied, distance between tool and work piece at the time of greatest approximation are advantageously defined so that the surface of the work piece has a roughness in the portion between the recesses after the machining, wherein the roughness on the one hand side is less than a depth of the indentations to be produced and/or the roughness Rz is between 1 and 4 μm.

The contact portion in the area between the indentations should be at the surface of the work piece after the structuring between 50% and 85% in order to provide a sufficient load bearing capability of the sliding surface in spite of the indentations introduced.

c) Embodiments

Embodiments according to the invention are subsequently described with reference to drawing figures wherein.

Figure 4A:
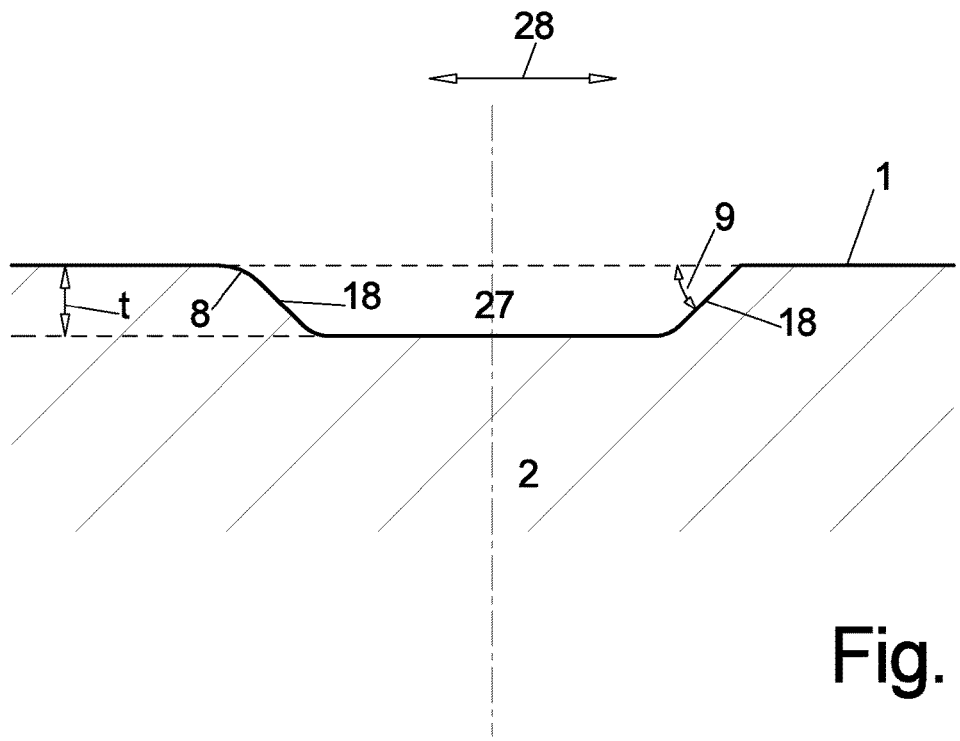
Figure 4B:
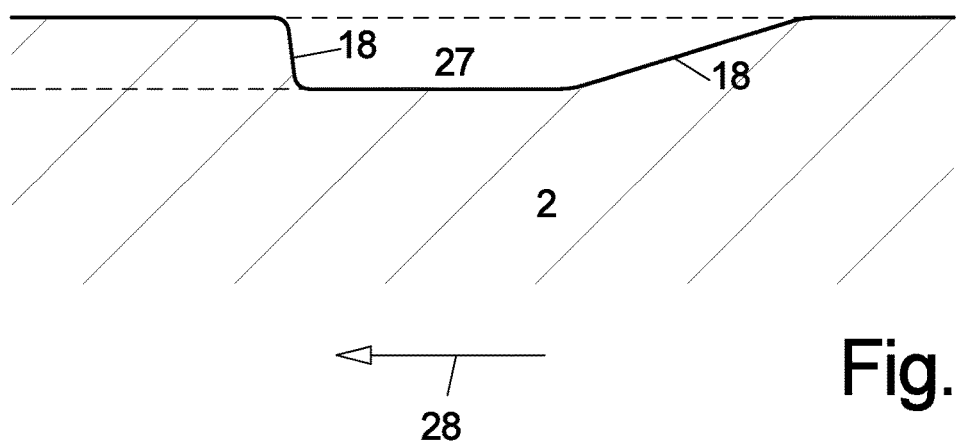
Figure 5D:
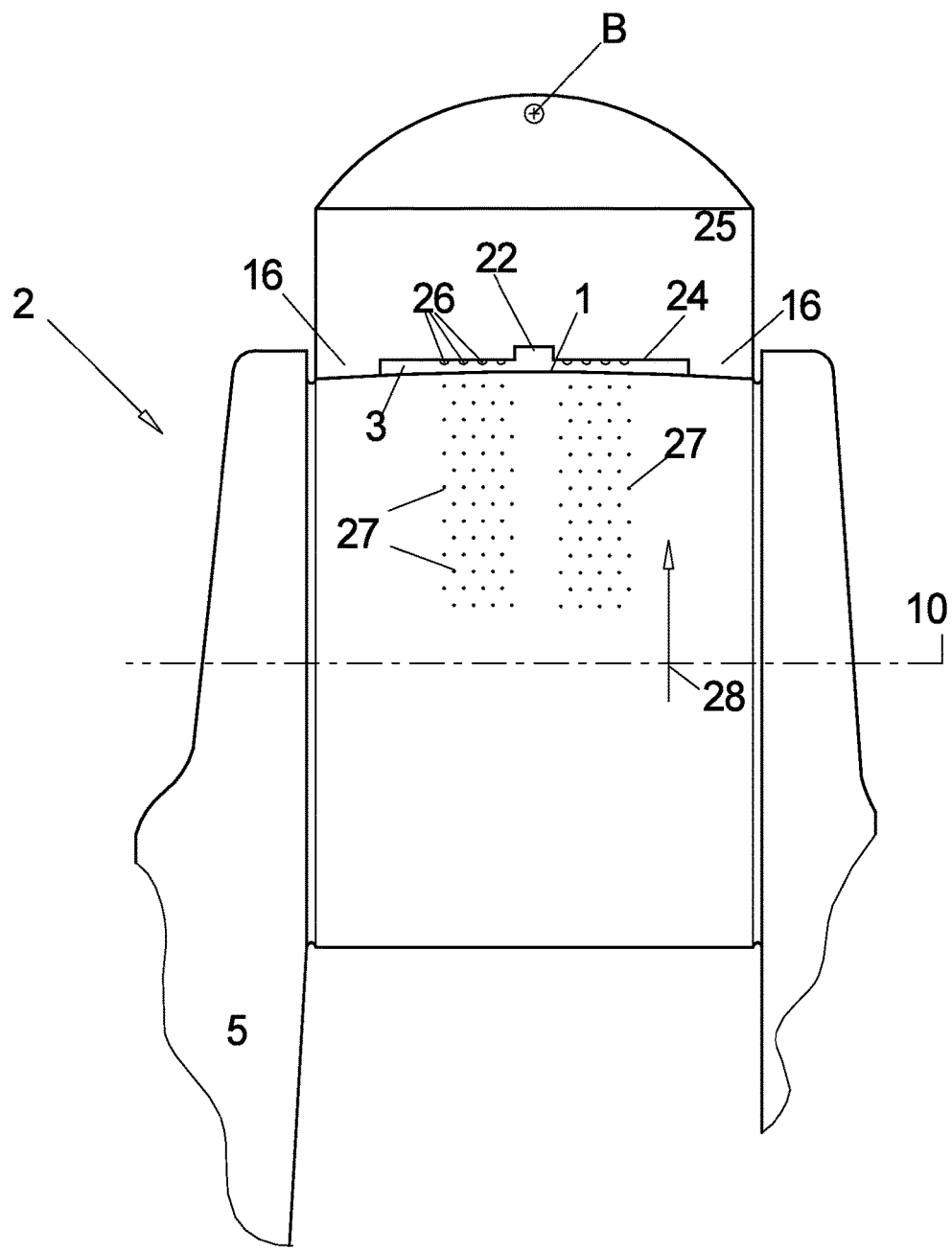

FIG. 4a, b illustrates sectional views of indentations of the sliding surface;

FIG. 5a illustrates a first method for providing the structuring;

FIG. 5b illustrates a second and a third method for providing the structuring;

FIG. 5c illustrates a top view of the effective surface of the tool;

FIG. 5d illustrates an axial view when producing a structuring;

FIG. 6 illustrates an enlarged view of the tool that is used at the sliding surface.

Figure 1:
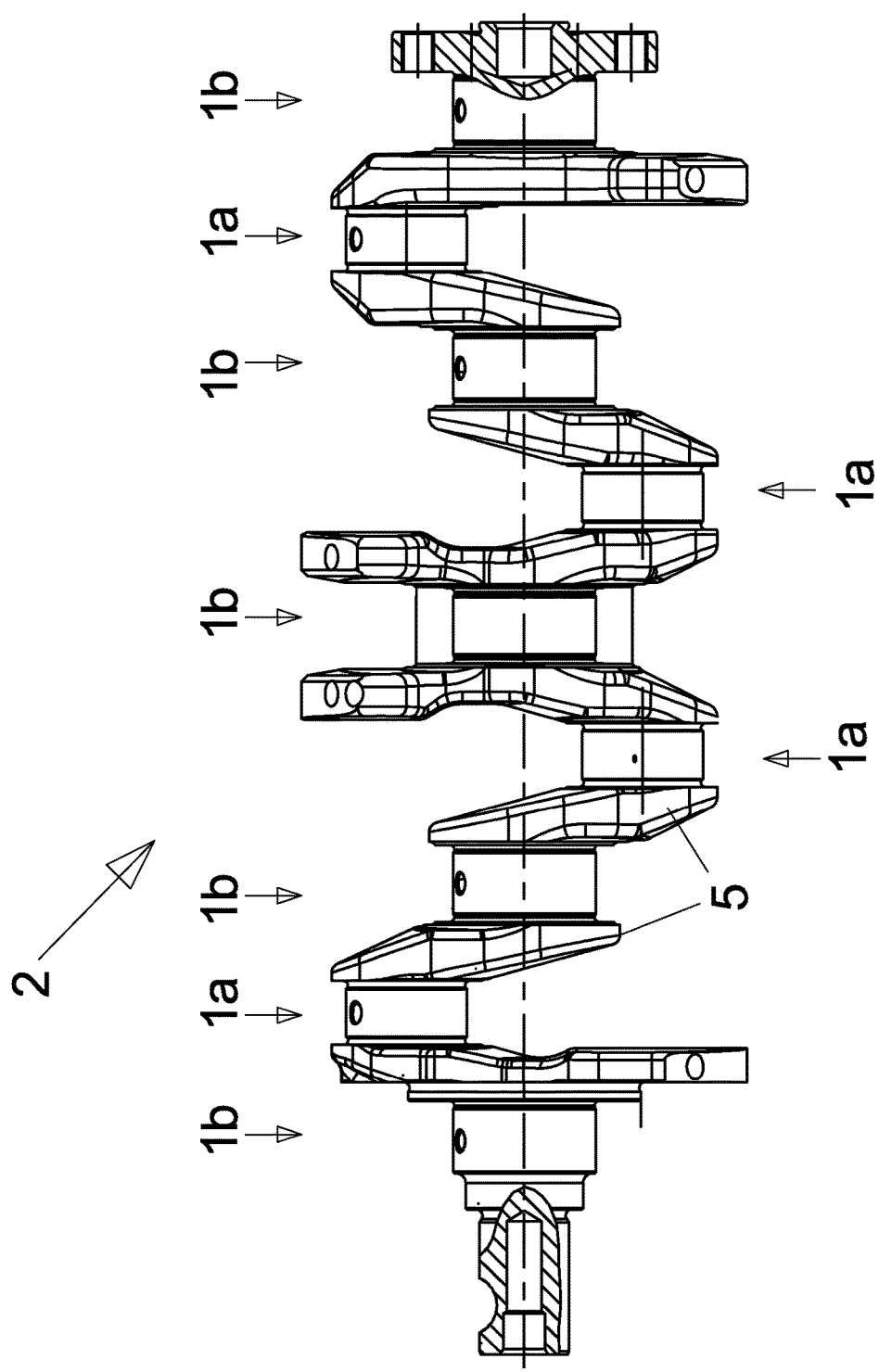
FIG. 1 illustrates a crank shaft for a four cylinder internal combustion engine in a side view.

FIG. 1 illustrates a typical work piece at which sliding surfaces 1 shall be structured for friction reduction through indentations, a crank shaft 2 for a four cylinder reciprocating piston engine in a side view in which a total of 5 center bearings 1b with substantially cylindrical enveloping surfaces configured as sliding surfaces 1 are provided on the subsequent rotation axis 10 of the crank shaft. Between these center bearings 1b one respective crank bearing out of a total of four crank bearings 1a is respectively provided radially offset to an outside, wherein the crank bearings also include an approximately cylindrical bearing surface as sliding surface 1 for an associated connecting rod and wherein the crank bearings are connected through lobes 5 with the center bearings 1b.

It is already apparent from this illustration that a crank shaft 2 of this type is only supported at its axial ends during the machining for example in a turning machine and represents a rather instable work piece due to its structure and easy bending in the center portion, instable in particular when machining precisions and approaching of a tool in a range of a few μm are at stake.

Figure 3A:
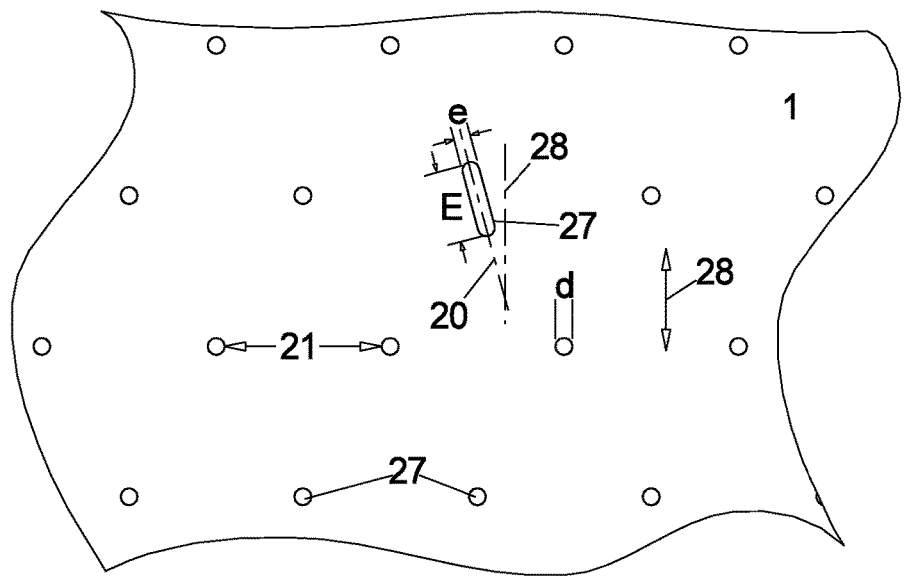
FIG. 3a illustrates a top view of a structured portion of a sliding surface.

A friction in a hydrodynamic sliding bearing in which a lubricant, typically oil is between the two sliding surfaces of the sliding pairing wherein the lubricant is distributed through the relative movement of the sliding surfaces over a respective sliding surface and forms a sliding film in the bearing gap, friction can be reduced when indentations 27 are introduced in a distribution into the sliding surface 1 as illustrated in FIG. 3a in a top view of the sliding surface 1.

In order to produce such indentations 27 in the μ range with a defined shape, size, depth and distance from one another in a reproducible and economic manner in large numbers electrochemical manufacturing (ECM) is used.

Thus an electrode which typically represents a negative shape of the sliding surface 1 that is to be produced thus which has protrusions 26 as illustrated in FIGS. 5a, b, is brought to a distance of a few μm relative to the sliding surface to be machined. An electrical current flowing from the tool 25 to the work piece 2 through an electrically conductive liquid 4, the electrolyte, in an operating gap 3 there between releases metal ions from a surface of the work piece and the contour of the tool 25 is imaged onto the surface of the work piece 2.

Already for a flat work piece surface to be machined approaching the tool 25 to 10-20 μm is difficult to reproduce in practical applications and only possible with and only possible with special machinery. For cambered and also rotation symmetrical surfaces that are to be machined, like e.g. bearings of a crank shaft which additionally can be cambered not only in circumferential direction but also in axial direction 10 this is particularly difficult, in particular when the entire bearing surface shall be structured.

Namely so far there are only methods in which no relative movement may occur during machining between work piece 2 and tool 25 along the effective surface 24 of the tool 25 and since the effective surface of the tool 25 can theoretically only cover 180° at the most in circumferential direction, in practical applications even significantly less, machining has to be performed for structuring the entire circumferential portion even with plural tools simultaneously or sequentially in segments which multiplies the difficulties with respect to an exact minimal approximation.

Figure 2A:
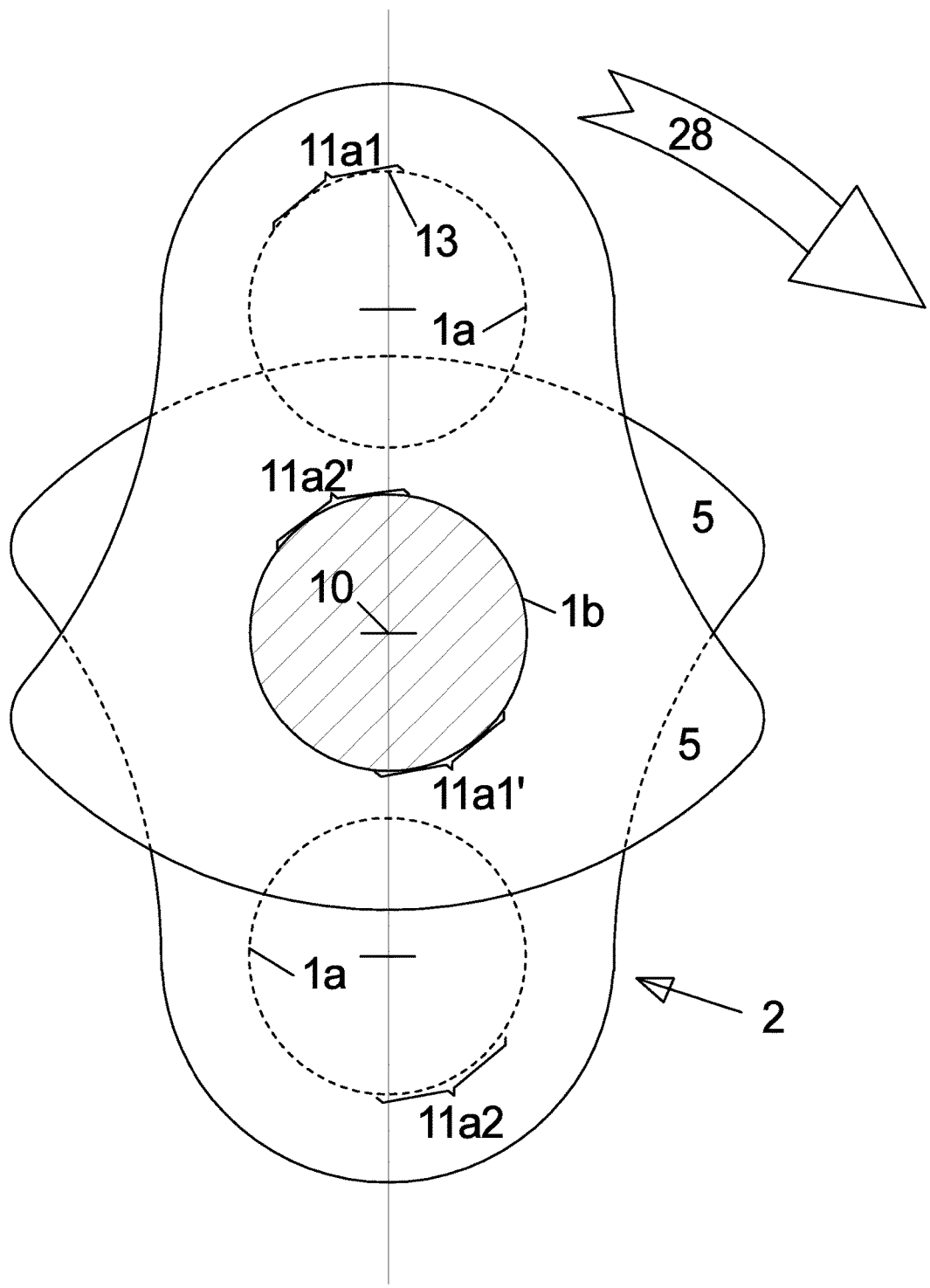
FIG. 2a illustrates the crank shaft of FIG. 1 in an axial direction cut through one of the center bearings.

Thus, according to the invention only a respective portion of a bearing of the crank shaft is structured, thus in circumferential direction of the bearings as illustrated in FIGS. 2a and b.

Figure 2B:
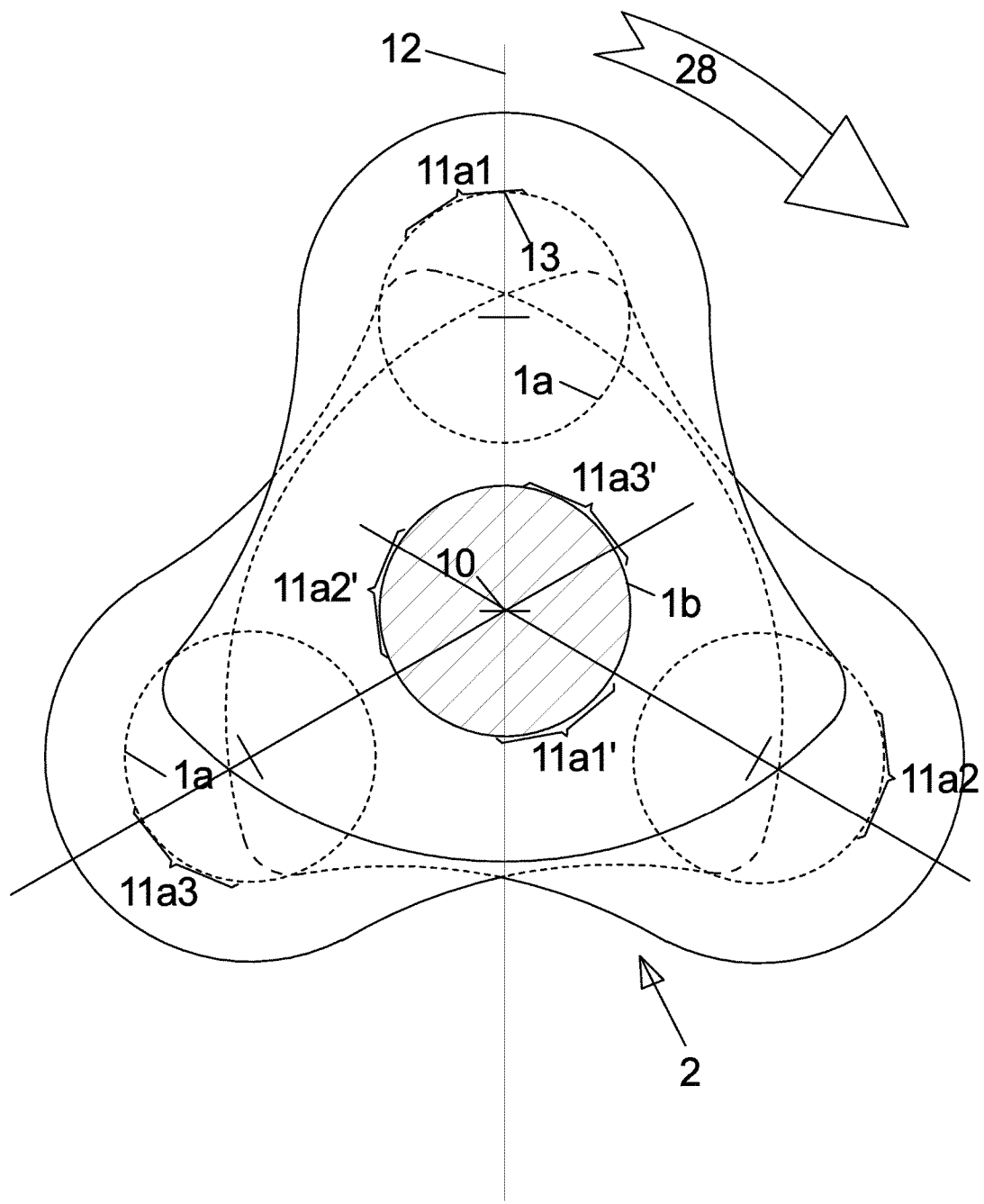
FIG. 2b illustrates a crank shaft for a six cylinder internal combustion engine in axial direction cut through a center bearing.

Namely for the illustrated crank shafts for a 4 cylinder engine (FIG. 2a) or a 6 cylinder reciprocating combustion engine (FIG. 2b) during operations the highest loading is provided on the crank bearing pinions 1a at the time when the gas mix is ignited and in the short time period thereafter in which the explosion pressure builds up in the cylinder and accelerates the piston downward. The non illustrated connecting rod then presses onto the circumferential portion 11a1 of the crank bearing 1a that is on top at the moment and whose center is arranged in rotation direction 28 of the crank shaft 2 behind the point 13 of the crank pin 1a that is radially the farthest away from the rotation axis 10 of the crank shaft.

Since the bearing shell of the connecting rod is supported not in a point but along a particular circumferential portion of the bearing pinion the most strongly loaded circumferential portion 11a1 depending how broadly it is defined is a portion which may even start shortly before the radially outermost point 13 and extends over an angular segment against the rotation direction 28 of e.g. 60°.

At another crank bearing pinion 1a this is the analog portion when the analog portion is in the highest position.

The pressure imparted by the connecting rod is primarily transferred to the respective crank bearing pinion and from there through the lobes 5 also at least onto the two axially adjacent center bearing pins 1b and less strongly also onto the center bearing pinions 1b that are axially further remote which are pressed through the pressure of the connecting rod into their bearing shell on the side arranged opposite to the circumferential portion 11a1 with the circumferential portion 111'.

Therefore the circumferential portions 11a1', 11a2' of the center bearing pinion 1b respectively diametrically opposed to the two circumferential portions 11a1 and 11a2 are also strongly loaded portions.

The strongly loaded circumferential portions are exclusively structured or more strongly structured than the rest of the circumferential portion, advantageously, however only these portions are structured in order to be able to omit the remaining circumferential portions.

With reference to an embodiment of a 6 cylinder crank shaft in 2b it is drawn that all highly loaded portions 11a, 11a2, 11a3 of all circumferential portions 11a1', 11a2', 11a3' that are arranged opposite to crank pins are respectively structured in all center bearing pinions 1b though only the circumferential portions arranged opposite to the two axially adjacent crank pinions could be structured.

This is based on the idea that also the loading on further remotely arranged crank bearing pinions can load the respective center bearing pinion in the respective circumferential portion more strongly.

Figure 3B:
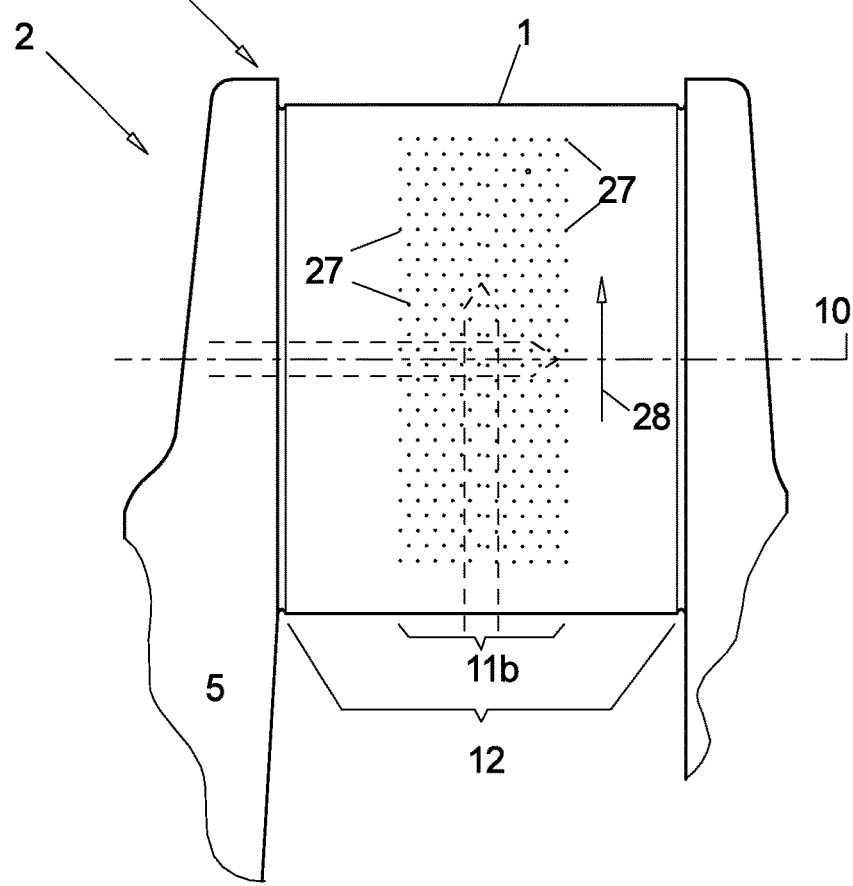
FIG. 3b illustrates an enlarged depiction of a bearing of a crank shaft.

FIG. 3b furthermore shows that only the center width portion of the bearing 1 is structured transversal to the movement direction, the circumferential direction thus in axial direction 10.

This is sufficient in many cases in particular when the bearing surface 1 as illustrated in FIG. 5d is not shaped cylindrical but slightly convex, namely in a sliding pairing with a cylindrical bearing shell this yields the smallest bearing gap in the center portion of the axial extension during operations and thus the greatest risk of the bearing seizing.

As illustrated in FIG. 3a in axial direction either the entire width of the bearing 1 or only an axial center portion of the bearing 1 is structured according to the invention optionally additionally to the structuring that may also be provided in circumferential direction only in portions. Thus, the sliding surface is provided in the structured portion with a plurality of very small indentations 27 as illustrated in the enlarged top view of FIG. 3a since it has become apparent that already structuring in portions significantly reduces friction but the non structured portion helps so that the load bearing capability of the bearing is only slightly reduced.

The indentations 27 are for example circular or also elongated in top view, for example provided in the form of a short groove with semi circular ends, wherein a distance 21 between the indentations 27 approximately corresponds to ten times a diameter d for circular indentations 27 or for elongated indentations 27 to the smallest extension e.

The surface portion of the indentations 27 within the structured portion should thus be in a range of 1% to 30%.

Advantageously the indentations 27 are thus arranged in an even pattern, for example a diamond shaped pattern whose first diagonal is in the circumferential direction 28.

In elongated indentations 27 the main extension 20 should be primarily arranged in the circumferential direction 28 of the bearing 1, thus of the subsequent direction of rotation and be at an angle thereto of 30° at the most.

It has furthermore become apparent that also shape and size of the indentations 27 is of great importance for reaching this goal as illustrated in the sectional views of FIGS. 4a, b.

Namely the indentations should have a depth of a few μm at the most, partially even have a depth below 1 μm since this reduces load bearing capability but still provides a sufficient depot effect and thus a friction reduction.

With reference to a depth t of the indentations 27, the indentations 27 can have a smallest extension, for example for circular indentations 27 a diameter d of 50 or even 150 μm, so that the indentations 27 are rather large and flat in relation to their depth t which is not realistically illustrated in FIGS. 4a, b for reasons of clarity since these figures shall illustrate a shape of flanks 18 of the indentations 27.

In a vertical sectional view as illustrated in FIG. 4a the indentations can be configured symmetrical, in particular rotation symmetrical, thus the flanks 18 shall have the same slant angle 9 relative to the surface of the bearing 1 which should be less than 60°.

Additionally and/or instead the flank 18 should transition into the surface of the bearing 1 with a curvature with at least a radius of 2 μm. Both measures help that the lubricant received in the indentations 27 during operations of the crank shaft can be transported well in circumferential direction 29 through the adhesion of the contact surface of the bearing and can thus be transported into the bearing gap remote from the indentations 27.

Thus it is not detrimental either to configure the flank 18 steeper that is arranged in the subsequent direction of rotation 35 of the crank shaft 2, since the lubricant is only transported along in the opposite direction. Thus, the volume of the individual indentations 27 is increased without any negative impact and the depot effect is improved.

Due to the small depth t of the indentations 27 which furthermore also develop their full effect without connections that are provided in a controlled manner, it is evident that the roughness of the surface of the bearing 1 has to be in a range in the surface portions between the indentations 27, wherein the range is lower than the depth t of the indentations 27.

Besides the fact that the portions between the indentations also have a sufficient contact portion of for example 60%-70% it is therefore useful as a function of the last machining step before the PECM machining to also electrochemically smoothen the portion between the indentations 27, thus to remove in particular the peaks of the microscopic surface structure in these portions.

FIG. 6 illustrates how this can be provided also in one method step together with introducing the indentations 27.

As illustrated with reference to FIG. 2 material is removed over the entire effective surface 24 of the electrode 25, the size of the material removal however is also a function of the distance 3 between the effective surface 24 and the work piece 2.

Therefore it is also feasible to configure the protrusions 26 on the electrode 25 with a much greater height h than the desired depth t of the indentations 27 to be produced therewith which has the consequence that the distance 3 between the electrode 25 and the work piece 2 between the protrusions 26 remains much greater and the material removal occurring at this place is accordingly lower.

By determining the height h with reference to the desired depth t, thus controlling the minimum distance 3 in the portion between the protrusions 26 towards the work piece 2 during machining material removal and thus the smoothing effect during introducing the indentations 27 into the portions there between can be controlled, namely as a function of additional parameters like current flow, material of the work piece 2 etc.

As illustrated in FIG. 6 in an enlarged portion this partially removes peaks of a microscopic surface structure provided in a portion between the indentations 27 so that the remaining valleys there between are less deep and the contact portion between the indentations 27 increases.

FIGS. 5a-d illustrate possible methods when introducing the indentations into the surface of the bearing 1.

Thus, the difficulty is that for an operating gap 3 between the tool 25, the electrode and the sliding surface to be machined for example also a camber of the effective surface 24 of the tool 25 in circumferential direction 28 has to coincide very precisely with the curvature of the sliding surface 1 in order to provide an operating gap at all locations that is constant within a range of 10-20 µm. In view of the machining imprecisions of the enveloping surface of the bearing 1 that are always present in the µ-range this is a challenge even when the tool 25 stands still relative to the bearing 1 during machining.

As illustrated in FIG. 5a the tool 25, whose effective surface extends in circumferential direction 28 over a circumference angle 6 of for example 100° can have spacers 16 in front and behind this circumferential portion wherein the spacers extend in the axial direction 10, the Z-direction and are placed onto the circumferential surface of the bearing 1 so that they contact it in order to generate a defined operating gap 3.

For this purpose the bearing 1 is advantageously radially supported on the opposite side through a support 23, for example a back rest 23.

For this purpose it is required, however, that either the tool 25 or the entire tool unit in which the tool 25 is arranged is either supported in a floating manner in Y-direction over a limited path of for example 50 µm since an active adjustment in Y-direction by such small amounts and in adaptation to the bearing 1 that is always shaped slightly differently is hardly possible.

Another option is that the tool 25 or the tool unit 14 is pivotable within limits about an axis that is parallel to the C-axis so that both spacers 16 can apply to the bearing 1. In the same manner additionally or instead, pivotability about the B-axis is useful in order to provide contact of the effective surface at the bearing through spacers 16 at both axial ends.

The spacers 16 are advantageously provided as spacer bars. As apparent in FIG. 5a they can extend in axial direction or as apparent in FIG. 5d they can extend in circumferential direction or individual, rather punctiform spacers can be respectively provided at corners of the rectangular surface of the tool 25.

Advantageously the effective surface 24 during processing shall not be at the same distance, the operating distance from the surface to be machined of the bearing 1, but the distance shall change in an intermittent, thus pulsating manner during machining so that in a condition of a slightly larger spacing the metal ions disengage from the surface of the work piece 2 can be flushed out more easily through the electrolyte 4 pressed into the operating gap 3 from the tool 25.

A pulsating movement of the tool 25 and thus variation of the operating gap which shall only amount to a few µm is rather difficult to implement in practical applications. Spacers 16 that are fixated at the tool 25 in this case would contact the work piece 2 again in case of a repeated approximation which either leads to strong wear of the spacer 16 which furthermore have to be made from electrically non conductive material, for example plastic or ceramic material and/or leave undesirable impressions on the bearing 1.

An option as illustrated in FIG. 5a in the left half is furthermore that the spacers 16 are moveably arranged in radial direction at the tool 25, thus it is feasible that the spacer 16 are permanently arranged at the sliding surface 1 to be machined and the vehicle moves back and forth in a pulsating manner relative to the spacers 16 in a direction towards the sliding surface 1 and away from the sliding surface 1.

In the right half of FIG. 5a it is illustrated as a second solution that a thickness variable element, for example a piezo element 15 is either arranged in the spacer 16 or in the tool 25 or between and a relative movement between the spacers 16 continuously contacting the sliding surface 1 and the tool 25 is facilitated. For these solutions and also for solutions that work totally without a spacer 26 the back pressure generated in the supply conduit for the electrolyte 4 is determined through a pressure sensor 17, in the supply conduit between pump and outlet opening in the effective surface 24 for the electrolyte 4 and can be used as a parameter for controlling the distance between the tool 25 and the sliding surface 1 to be machined namely the reduced run out capability of the electrolyte caused by the narrowing operating gap immediately leads to a higher pressure in the supply conduit.

FIG. 5d illustrates that a straight effective surface 24 can be selected in axial direction 10 with protrusions 26 at the tool 25 in spite of the contour at the bearing 1 that is convex in this direction by a few µm. Thus the tool 25 can contact the sliding surface 1 at the axial ends through spacers 16. Through the operating gap 3 that is smaller in the center portion in axial direction the indentations generated at this location at the surface of the work piece will be deeper than in the axial end portions which however corresponds to the loading and the smallest bearing gap in the center portion during subsequent operations. Additionally it is avoided in this way to have to generate a convex effective surface 24 at the tool 25 in this direction.

FIG. 5b illustrates in the lower half of the depiction that for large structured circumferential portions also a flat operating surface 24 can be used which can roll through circumferentially extending lateral stop bars 16 on the rotation symmetric bearing 1 over a desired circumferential segment.

In the upper half of the figure it is illustrated that the work piece 25 can also have an effective surface 24 that is cambered concave in axial direction, whose curvature radius 7 however is slightly greater than the convex curvature of the bearing 1.

Regardless whether the tool stands still relative to the work piece during machining or the tool and the work piece roll on one another the operating gap 3 provided in this manner during machining can either be set to a minimum in circumferential direction 28 in the center portion, thus in the portion of the highest loading and the indentation 27 produced at this location can have the greatest depth or can generate indentations 27 in circumferential direction 28 that have uniform depth everywhere.

The surface to be structured and the effective surface 24 of the tool 25 is typically not square but larger in one extension than in one another. In the embodiment illustrated in FIGS. 5*a* and *c*, wherein FIG. 5 illustrates a top view of the effective surface 24 the larger extension is in circumferential direction 28.

In order to still provide an even outlet of the electrolyte 4 in all directions with the same speed from the inlet opening for the electrolyte 4 a flushing groove 22 is advantageously machined into the effective surface 24 wherein the flushing groove extends in the direction of the greatest extension of the effective surface 24, wherein the flushing groove can terminate freely in the narrow faces of the effective surface 24 but wherein the flushing groove can also terminate earlier.

Thus the electrolyte 4 can distribute in the direction of the greatest extension with low flow resistance and can distribute from there in a direction of the smallest extension, in this case the axial extension of the effective surface 24 through the operating gap 3.

REFERENCE NUMERALS AND DESIGNATIONS 1 bearing
2 crank shaft, work piece
3 distance
4 fluid, electrolyte
5 drip pan
6 circumferential angle
7 curvature radius
8 curvature
9 slant angle
10 axial direction, rotation axis
11 bed
12 spindle stock
13 work piece spindle
14 opposite spindle stock
15 Z-support
16 Z-slide
17 X-slide
18 flank
19 front cover
20 main extension
21 distance
22 mask
23 gap
24 effective surface
25 tool, etching tool, electrode
26 protrusion
27 indentation
28 circumferential direction
29 pass through
30 machine
31 vibrator
32 particles
33 bore hole
34 tool unit
35 rotation direction
d diameter
e smallest extension
E largest extension
t depth
h height

The invention claimed is:

1. A sliding bearing surface (1) of a system for a reciprocating internal piston combustion engine comprising:
a crank shaft with a center bearing (1*b*) held in a bearing shell and with a crank bearing (1*a*) coupled to a connecting rod, which is connected to a piston, with the sliding bearing surface (1) being a surface of the connecting rod, the crank bearing, the center bearing or the bearing shell for sliding movement along an opposite surface of respectively the crank bearing, the connecting rod, the bearing shell or the center bearing and for forming a sliding pairing with the respective opposite surface which is structured through indentations (27),
characterized in that
the surface of the crank bearing has in a movement direction of the crank shaft a first portion (11*a*1, 11*a*2) of up to 30° in rotation direction and up to 60° against rotation direction from a top dead center of the crank shaft;
the surface of the connecting rod has in a movement direction of the connecting rod a second portion of up to 30° in rotation direction and up to 60° against rotation direction from a point corresponding to the top dead center of the crank shaft;
the surface of the center bearing has a third portion (11*a*1', 11*a*2') diametrically opposed in a flat projection along the rotation axis (10) of the crank shaft to the first portion (11*a*1, 11*a*2) of the crank bearing; or
the surface of the bearing shell has a fourth portion diametrically opposed in a flat projection along the rotation axis (10) of the crank shaft to the second portion of the connection rod; or
wherein the sliding bearing surface (1) in the first, second, third or fourth portion either is structured differently from other areas of the sliding bearing surface (1) or is only structured in these portions (11*b*, 11*a*1, 11*a*2, 11*a*1', 11*a*2').

2. The sliding bearing surface (1) according to claim 1, characterized in that
either the surface of the center bearing has two third portions and/or the surface of the bearing shell has two fourth portions respectively diametrically opposed to the first portions (11*a*1, 11*a*2) of the two adjacent crank bearings or opposed to the second portions of adjacent connection rods,
or the surface of the center bearing has several third portions and/or the surface of the bearing shell has several fourth portions each thereof respectively diametrically opposed to the first portion (11*a*1, 11*a*2) of all crank bearings or all connection rods,
wherein said two or several third and/or fourth portions are structured differently from remaining areas of the sliding bearing surface (1) or are the only portions that are structured.

3. The sliding bearing surface (1) according to claim 1, characterized in that only one of the surface and the opposite surface of the sliding pairing is structured.

4. The sliding bearing surface (1) according to claim 1, characterized in that the structured surface includes indentations (27), which have a depth (t') of 10 μm at the most, and/or in the portion between the indentations the surface has a roughness Rz which is less than a depth of the indentations and below 5 μm and/or has a contact portion of at least 50%, however at the most 85%.

5. The sliding bearing surface (1) according to claim 1, characterized in that the portion structured differently or structured only is provided with the indentations (27) and is 1% to 30% of the sliding bearing surface (1), and/or the ratio of depth (t) to greatest surface extension (E) of the indentations is between 0.005 and 0.02.

6. The sliding surface according to claim 5, characterized in that in top view a smallest extension (e) of an indentation (27) of the indentations (27) 150 μm at the most, and/or in top view the greatest extension (E) of an indentation (27) of the indentations (27) is at the most 10 times the size of the smallest extension (e).

7. The sliding surface according to claim 1, characterized in that the structured surface indentations (27) have a curvature (20) with a radius of at least 2 μm or a slant angle (9) of less than 60° relative to the surface at a transition between the flanks (18) to the surface of the bearing (1), or in a sectional view arranged in a relative movement direction of the sliding surface, in the circumferential direction (28) of the indentations (27) a flank (18) of the indentation (27) that is oriented against the movement direction extends less steep than the opposite flank (18), at an angle of 45° at the most, relative to the surface between the indentations (27).

\* \* \* \* \*